United States Patent
Lee et al.

(10) Patent No.: US 9,328,856 B2
(45) Date of Patent: May 3, 2016

(54) USE OF PRESSURE REDUCTION DEVICES FOR IMPROVING DOWNSTREAM OIL-AND-WATER SEPARATION

(71) Applicant: Cameron International Corporation, Houston, TX (US)

(72) Inventors: Joseph Min-Hsiun Lee, Houston, TX (US); Gary W. Sams, Spring, TX (US)

(73) Assignee: Cameron International Corporation, Houston, TX (US)

(*) Notice: Subject to any disclaimer, the term of this patent is extended or adjusted under 35 U.S.C. 154(b) by 30 days.

(21) Appl. No.: 14/166,375

(22) Filed: Jan. 28, 2014

(65) Prior Publication Data
US 2014/0209176 A1 Jul. 31, 2014

Related U.S. Application Data

(60) Provisional application No. 61/757,800, filed on Jan. 29, 2013.

(51) Int. Cl.
| | |
|---|---|
| *E21B 7/12* | (2006.01) |
| *F16L 55/027* | (2006.01) |
| *B01D 17/12* | (2006.01) |
| *C10G 31/06* | (2006.01) |
| *C10G 33/06* | (2006.01) |

(52) U.S. Cl.
CPC .............. *F16L 55/027* (2013.01); *B01D 17/12* (2013.01); *C10G 31/06* (2013.01); *C10G 33/06* (2013.01); *Y10T 137/0324* (2015.04); *Y10T 137/7287* (2015.04)

(58) Field of Classification Search
CPC .................. E21B 43/34; E21B 43/36
USPC ........................................................ 166/357
See application file for complete search history.

(56) References Cited

U.S. PATENT DOCUMENTS

| | | | | |
|---|---|---|---|---|
| 3,759,324 A | * | 9/1973 | Mecusker | 166/75.12 |
| 3,780,767 A | | 12/1973 | Borg et al. | |
| 3,798,153 A | * | 3/1974 | Arndt, Jr. et al. | 8/48 AA |

(Continued)

FOREIGN PATENT DOCUMENTS

| | | | | |
|---|---|---|---|---|
| EP | 2548936 A1 | | 1/2013 | |
| WO | WO-0159257 | * | 8/2001 | E21B 43/22 |
| WO | 2009093035 A2 | | 7/2009 | |

OTHER PUBLICATIONS

J.O. Hinze, "Fundamentals of the hydrodynamic mechanism of splitting in dispersion processes," AIChE Journal, vol. 1, No. 3, pp. 289-295.

*Primary Examiner* — Matthew R Buck
*Assistant Examiner* — Aaron Lembo
(74) *Attorney, Agent, or Firm* — Gable Gotwals

(57) ABSTRACT

A system and method for improving oil-and-water separation in a blended fluid stream are presented. The system includes a pressure reduction device that causes cyclonic flow in the stream. The pressure reduction device may be a wafer-based hydrocyclone or a modified hydrocyclone having an underflow outlet but no overflow outlet. The system may also include a valve that is located upstream or downstream of the pressure reduction device. Both the valve and the pressure reduction device reduce the pressure of the fluid stream while reducing the shearing of oil and water droplets within the stream. As a result, the droplets are more likely to coalesce and less likely to form emulsions, thus improving oil-and-water separation in downstream treatment processes.

22 Claims, 4 Drawing Sheets

(56) References Cited

U.S. PATENT DOCUMENTS

| | | | |
|---|---|---|---|
| 3,802,501 A * | 4/1974 | Mecusker | 166/75.12 |
| 4,159,036 A * | 6/1979 | Wilson et al. | 166/267 |
| 4,415,434 A * | 11/1983 | Hargreaves et al. | 208/411 |
| 4,576,005 A * | 3/1986 | Force | 60/618 |
| 4,596,586 A * | 6/1986 | Davies et al. | 95/261 |
| 4,844,817 A * | 7/1989 | Flanigan et al. | 210/788 |
| 4,900,445 A * | 2/1990 | Flanigan et al. | 210/512.1 |
| 5,050,676 A * | 9/1991 | Hess et al. | 166/267 |
| 5,076,360 A * | 12/1991 | Morrow | 166/267 |
| 5,093,006 A * | 3/1992 | Kalnins | 210/704 |
| 5,464,309 A * | 11/1995 | Mancini et al. | 405/128.25 |
| 6,245,955 B1 * | 6/2001 | Smith | 585/15 |
| 6,340,373 B1 * | 1/2002 | Billington | 23/295 R |
| 6,564,619 B2 * | 5/2003 | Dutton et al. | 73/61.44 |
| 6,893,558 B1 * | 5/2005 | McGee et al. | 210/170.01 |
| 7,048,865 B1 * | 5/2006 | McGee et al. | 210/787 |
| 7,093,661 B2 * | 8/2006 | Olsen | 166/357 |
| 7,147,788 B2 * | 12/2006 | Tveiten | 210/788 |
| 7,152,681 B2 * | 12/2006 | Olsen et al. | 166/357 |
| 7,152,682 B2 * | 12/2006 | Hopper | 166/357 |
| 7,179,386 B2 | 2/2007 | Lange | |
| 7,210,530 B2 * | 5/2007 | Lush et al | 166/357 |
| 7,244,364 B1 | 7/2007 | Weber | |
| 7,654,330 B2 * | 2/2010 | Zubrin et al. | 166/369 |
| 7,976,613 B2 * | 7/2011 | Amin | 95/153 |
| 8,173,854 B2 * | 5/2012 | McCoy et al. | 585/648 |
| 8,226,742 B2 * | 7/2012 | Abrand et al. | 95/24 |
| 8,257,055 B2 * | 9/2012 | Beg et al. | 417/87 |
| 8,273,151 B2 * | 9/2012 | Miotto et al. | 95/24 |
| 8,286,805 B2 * | 10/2012 | Hopper | 210/512.1 |
| 8,425,667 B2 * | 4/2013 | Anderson et al. | 95/259 |
| 8,496,815 B2 * | 7/2013 | Brix et al. | 210/170.07 |
| 8,512,576 B2 * | 8/2013 | Sarshar et al. | 210/788 |
| 8,529,772 B2 * | 9/2013 | Hopper | 210/787 |
| 8,607,894 B2 * | 12/2013 | McDonald et al. | 175/5 |
| 8,617,405 B2 * | 12/2013 | Hopper | 210/787 |
| 8,815,100 B2 * | 8/2014 | Chantrel et al. | 210/788 |
| 8,869,889 B2 * | 10/2014 | Palmer et al. | 166/260 |
| 2010/0224363 A1 * | 9/2010 | Anderson et al. | 166/266 |
| 2012/0000668 A1 * | 1/2012 | Rexilius et al. | 166/369 |

\* cited by examiner

USE OF PRESSURE REDUCTION DEVICES FOR IMPROVING DOWNSTREAM OIL-AND-WATER SEPARATION

CROSS-REFERENCE TO RELATED APPLICATIONS

The present application claims priority to U.S. Provisional Patent Application No. 61/757,800 filed on Jan. 29, 2013, which is incorporated herein by reference.

BACKGROUND OF THE INVENTION

In the oil-and-gas industry, blended fluid streams from wellheads or treatment processes must frequently be divided into separate streams of oil and water. However, blended fluid streams frequently have high pressures which must be reduced, both to protect downstream equipment and to improve the effectiveness of subsequent treatment processes. As an example, the fluid pressure from the wellhead depends upon the pressure of the reservoir. If the produced fluid stream is predominantly natural gas, the pressure may be 1,000 pounds per square inch (psi) or greater. Alternatively, if the produced fluid stream is predominantly oil, the pressure may be in the several hundred psi range.

Choke or control valves are conventionally used in the industry to regulate flow rates and fluid pressures. These valves can significantly reduce the pressure of a fluid stream. However, the pressure reduction corresponds to increased turbulence of the fluid stream flow. Oil and water droplets in the fluid stream may break apart due to the increased turbulence, causing the formation of oil-in-water or water-in-oil emulsions. Once formed, these emulsions are difficult to separate and can impair the performance of downstream treatment processes. In addition, smaller oil-and-water droplets, which are more easily dispersed in the fluid stream, are less likely to coalesce into larger droplets that can be separated.

If downstream oil-and-water separation processes are less effective, the oil stream may not meet the applicable standards for use. Similarly, the water stream may not meet the applicable standards for use, recycling, or disposal to a wastewater treatment plant or the environment. Alternatively, additional treatment steps or processes may be required, potentially increasing treatment costs, the types and quantities of chemicals used, and the amount of space needed to accommodate the process equipment. This may be a particular concern for off-shore applications, where space for equipment and storage is limited and transportation is difficult and expensive.

A need exists for a system that can achieve the required pressure drop while improving downstream oil-and-water separation. This improvement may be accomplished by reducing the shearing of oil or water droplets and the formation of tight oil-in-water and water-in-oil emulsions.

SUMMARY OF THE INVENTION

An improvement for a system includes a pressure reduction device located between the source of an oil-in-water or water-in-oil stream and the immediate next downstream process. The pressure reduction device may be located upstream or downstream of a valve, which may be a flow control valve, a wellhead choke valve, or a mixing valve. The pressure reduction device, which may be a wafer-based hydrocyclone or a modified hydrocyclone having an underflow outlet but no overflow outlet, causes a cyclonic flow of the stream such that the shearing of oil droplets and water droplets through the pressure reduction device is less than through the conventional valve alone.

This invention also provides a method for improving oil-and-water separation in a fluid stream. The method includes the steps of reducing the pressure of the fluid stream by passing it from a source of an oil-in-water or water-in-oil stream to a pressure reduction device and causing cyclonic flow of the stream as it passes through the pressure reduction device. The pressure of the stream may also be reduced as it passes through a valve located upstream or downstream of the pressure reduction device. The pressure reduction device may be a wafer-based hydrocyclone or a modified hydrocyclone having an underflow outlet but no overflow outlet, and the valve may be a flow control valve, a wellhead choke valve, or a mixing valve. Passage through the pressure reduction device results in less shearing of oil droplets and water droplets than passage through the conventional valve alone.

Objects of the invention are to (1) reduce the pressure of the incoming fluid stream to a level that is suitable for downstream uses or treatment; (2) have low shear so that droplets of oil and water are not broken into smaller droplets; (3) improve the efficiency of downstream oil-and-water separation and the quality of the separated streams; and (4) provide equipment that can be scaled to accommodate high flow rates.

DETAILED DESCRIPTION OF THE PREFERRED EMBODIMENTS

Figure 1:
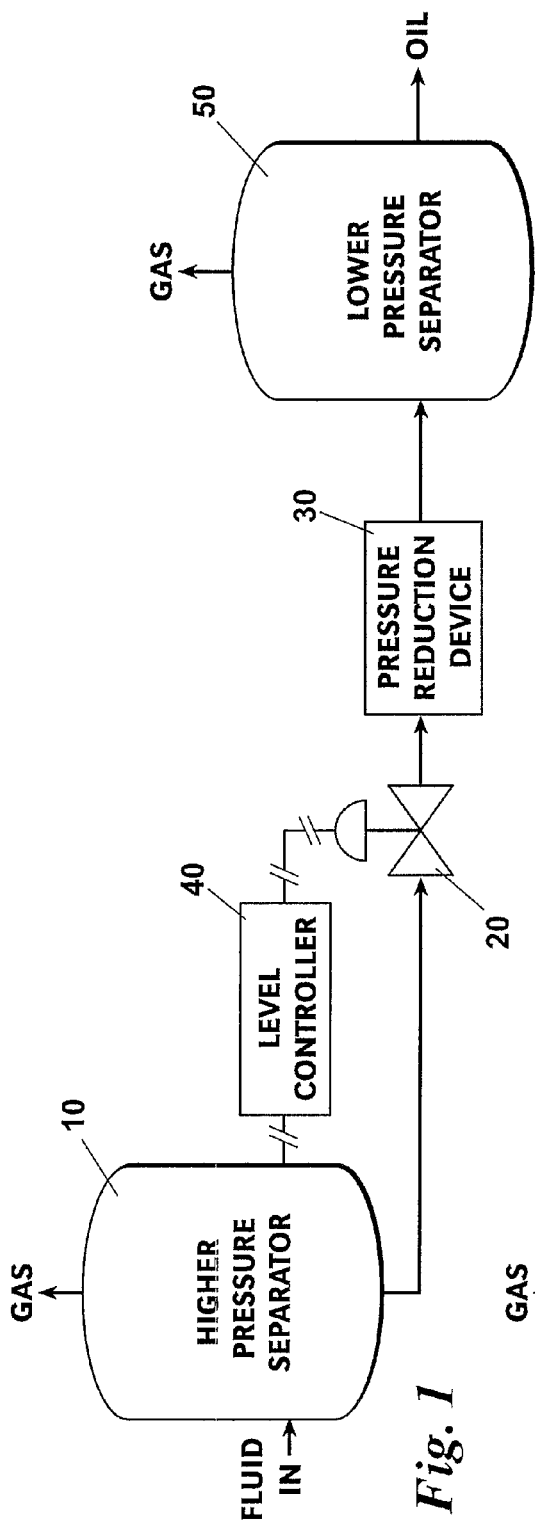
FIG. 1 is a flow diagram showing the system for improving oil-and-water separation, according to an embodiment of the present invention. The system is comprised of a flow control valve followed by a pressure reduction device.

Referring to FIG. 1, a system for improving oil-and-water separation is comprised of a flow control valve 20 and a pressure reduction device 30. The fluid stream may be a blended stream from a wellhead or a treatment process, such as a first separator vessel 10, and contain gas, oil, and water. The first separator vessel may be a higher-pressure separator.

For example, free natural gas is generally separated from the remaining oil-and-water stream in a higher-pressure separator.

The fluid stream first flows through the flow control valve 20, where the initial pressure drop occurs. The flow control valve 20 regulates the flow rate of the fluid stream before it enters the pressure reduction device 30. The pressure drop across the flow control valve 20 may be less than 20 psi and may be preferably less than 10 psi. The flow control valve 20 is also designed so that it reduces the shearing of oil and water droplets in the fluid stream. A level controller 40, which opens and closes the flow control valve 20, may be used to regulate the amount of fluid entering the pressure reduction device 30.

The fluid stream flows from the flow control valve 20 to the pressure reduction device 30, where the majority of the pressure drop occurs. As an example, this pressure drop may range from approximately 50 percent to approximately 98 percent. The pressure reduction device 30 creates a cyclonic flow within the device. The pressure reduction device may be a hydrocyclone having a single outlet, such as the Deltaclone™, which is designed for reducing pressure of liquid streams containing abrasive solids. The pressure reduction device may also be a modified hydrocyclone which has an underflow outlet but no overflow outlet.

The Deltaclone™ has an inlet, an outlet, and one or more wafers connected in series. The size and number of wafers in the Deltaclone™ may vary depending upon the flow rate, the desired pressure reduction, and other factors, and all of the wafers may be contained within a single housing. The fluid stream enters the Deltaclone™ through the inlet, flows through each wafer in sequence, and exits through the outlet.

Each wafer has a cyclonic portion, which tangentially creates a vortex as the fluid stream enters. As the fluid stream moves through the wafer in opposition to the strong acceleration field generated, a portion of the stream's pressure is converted into cyclonic kinetic energy and dissipated. Because this reduction in pressure occurs over a large volume when compared to the orifice-type devices such as cage-and-piston type chokes or valves, oil and water droplets in the fluid stream are less likely to be sheared into smaller droplets, thereby facilitating downstream oil-and-water separation. Fluid streams with higher flow rates have higher pressure drops. For example, increasing the flow rate to the Deltaclone™ by a factor of two increases the pressure drop by a factor of about four.

Figure 2:
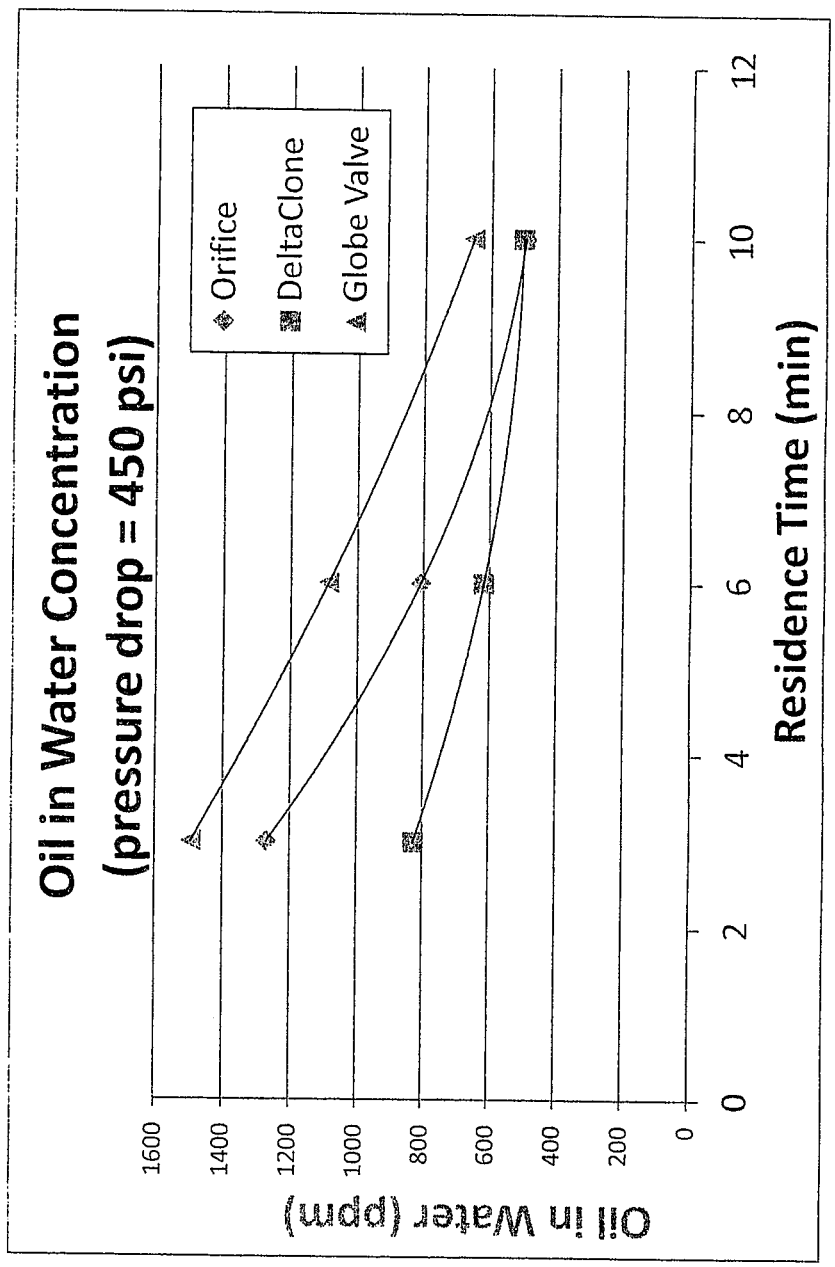
FIG. 2 is a chart comparing the separation efficiency of a MOZLEY® DELTACLONE™ hydrocyclone ("the Deltaclone™") as described in U.S. Pat. No. 7,179,386 (Cameron, Houston, Tex.), to the separation efficiency of a standard orifice-type valve and a ¾-inch globe valve at residence times of three, six, and ten minutes.

FIG. 2 compares the separation efficiency of the Deltaclone™ when compared to a standard orifice-type valve and a ¾-inch globe valve. An oil-and-water stream consisting of 80 percent water and 20 percent oil was pumped through each device to generate a pressure drop of 450 psi through the device. The resulting emulsified fluid from each device was collected in a separatory funnel. The water from the bottom of each funnel was withdrawn at three, six, and ten minutes of residence time and measured to determine its oil-in-water concentration in parts per million.

As shown in FIG. 2, at residence times of three and six minutes, the oil-in-water concentration for the Deltaclone™ is lower than the orifice-type and globe valves. This suggests that the fluid stream experiences less shearing as it moves through the Deltaclone™. Also as shown in FIG. 2, the oil-in-water concentration for the Deltaclone™ is about 800 parts per million at a residence time of three minutes. In order to achieve the same oil-in-water concentration, the separation time for the conventional globe valve must be increased to 8.5 minutes. Based on this information, Stoke's Law can be used to infer that the droplet size from the Deltaclone™ is approximately 1.7 times larger than the droplet size from the globe valve.

In another embodiment of the invention, the pressure reduction device is a modified hydrocyclone. The modified hydrocyclone has one or more inlets that receive the fluid stream from the flow control valve. The fluid stream then flows through the body of the modified hydrocyclone to the tail section and exits at the underflow. Depending upon the application, one hydrocyclone may be used or multiple hydrocyclones may be located within a single housing.

The arrangement of inlets promotes a high fluid spin within the modified hydrocyclone, resulting in the rapid formation of a stable vortex. As the bulk of the fluid stream moves through the hydrocyclone, part of the stream's pressure is converted into kinetic energy and dissipated. Higher fluid stream flow rates are associated with higher pressure drops as the fluid stream moves through the hydrocyclone. Depending upon the flow rate of the fluid stream and the number and design of the hydrocyclones, the pressure drop may be as high as several hundred psi.

Like the Deltaclone™, the modified hydrocyclone prevents oil and water droplets in the fluid stream from being sheared into smaller droplets. Each oil droplet moves toward the central core of the hydrocyclone, increasing the concentration of oil droplets. As a result, the oil droplets coalesce into larger droplets more readily, facilitating oil-and-water separation in downstream treatment processes. The pressure reduction device may also promote the coalescence of water droplets that were sheared as they passed through the flow control valve, making them easier to remove from the fluid stream. In addition, the oil and water droplets are less likely to form emulsions that may negatively affect subsequent treatment.

After the fluid stream passes through the pressure reduction device 30, it flows to additional treatment processes, such as a second separator vessel 50. This separator vessel may be a lower-pressure separator, where the evolved gas is removed from the remaining oil-and-water stream. This reduces the vapor pressure of the oil to be transported by tanker or pipeline. The pressure of the lower-pressure separator may vary according to the oil vapor specification requirements of the tanker or pipeline, and may range from approximately 50 psi to approximately 100 psi. The number and type of additional treatment processes may vary with the characteristics of the fluid stream and the desired outcome.

Figure 3:
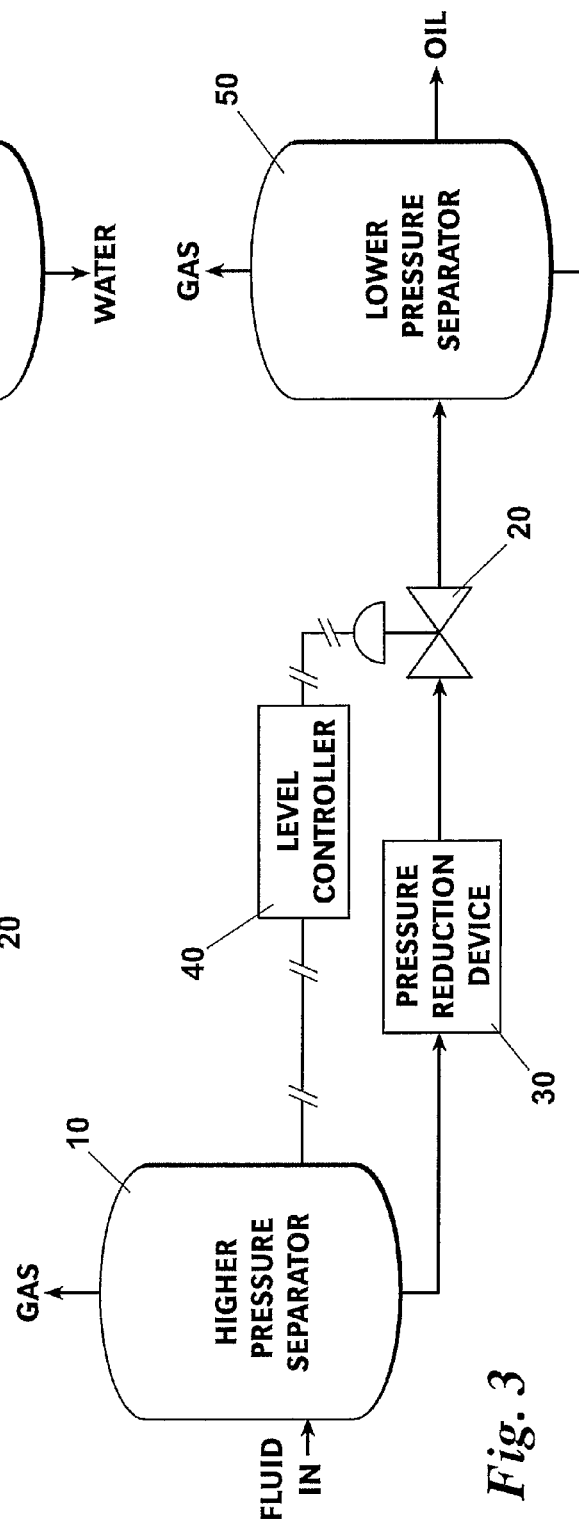
FIG. 3 is a flow diagram showing the system for improving oil-and-water separation, according to an embodiment of the present invention. The system is comprised of a pressure reduction device followed by a flow control valve.

Referring to FIG. 3, an embodiment for a system for improving oil-and-water separation is comprised of a pressure reduction device 30 followed by a flow control valve 20. The flow control valve 20 may be regulated by a level controller 40, and the system may be placed between an upstream treatment process, such as a first separator vessel 10, and a downstream treatment process, such as a second separator vessel 50. As described for FIG. 1, the pressure reduction device 30 may be a hydrocyclone having a single outlet or a modified hydrocyclone having an underflow outlet but no overflow outlet. The majority of pressure reduction of the fluid stream occurs in the pressure reduction device. As an example, the pressure reduction may range from approximately 50 percent to approximately 98 percent.

Figure 4:
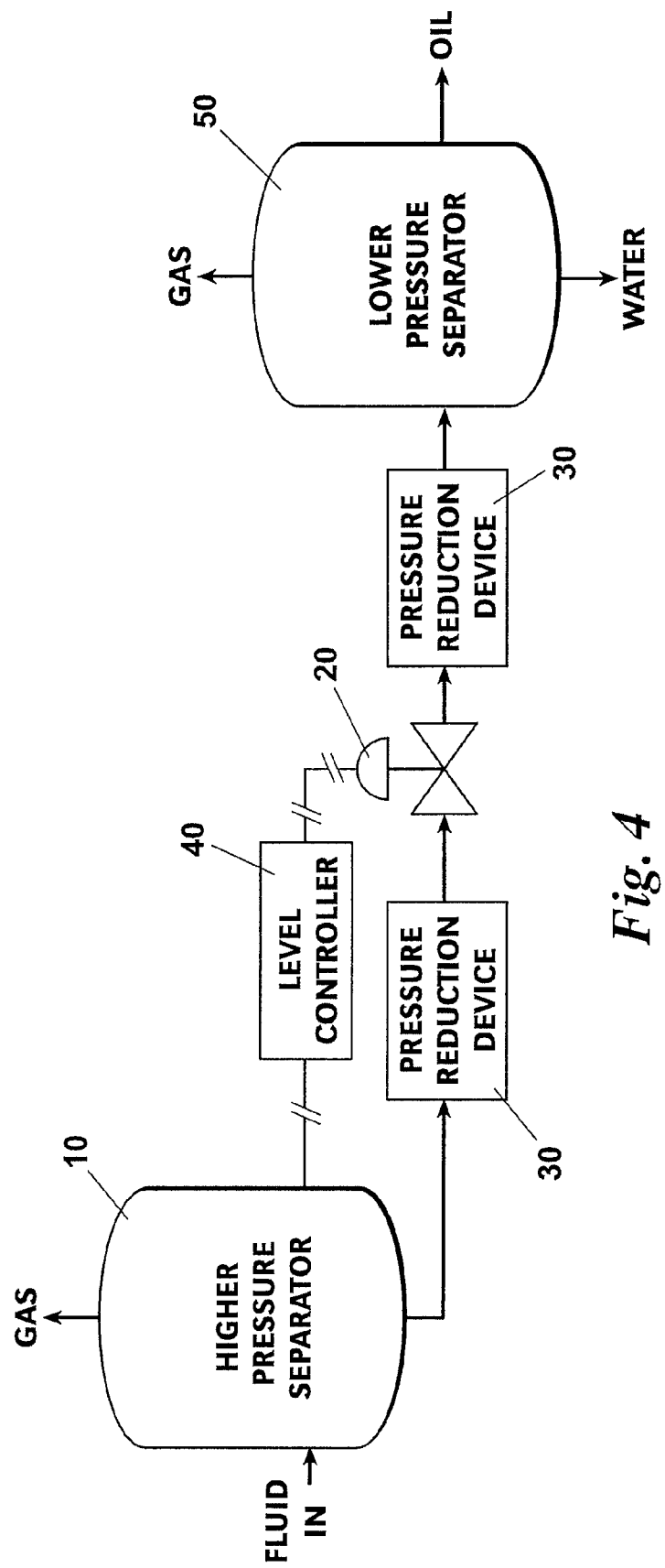
FIG. 4 is a flow diagram showing the system for improving oil-and-water separation, according to an embodiment of the present invention. The system is comprised of a pressure reduction device, a flow control valve regulated by a level controller, and a second pressure reduction device.

Referring to FIG. 4, an embodiment for a system for improving oil-and-water separation is comprised of a pressure reduction device 30 followed by a flow control valve 20 and a second pressure reduction device 30. The second pressure reduction device 30 may be used to coalesce droplets that were sheared by the flow control valve 20. The flow control valve 20 may be regulated by a level controller 40, and the system may be placed between an upstream treatment process, such as a first separator vessel 10, and a downstream treatment process, such as a second separator vessel 50. As described for FIG. 1, the pressure reduction device 30 may be a hydrocyclone having a single outlet or a modified hydrocyclone having an underflow outlet but no overflow outlet.

Figure 5:
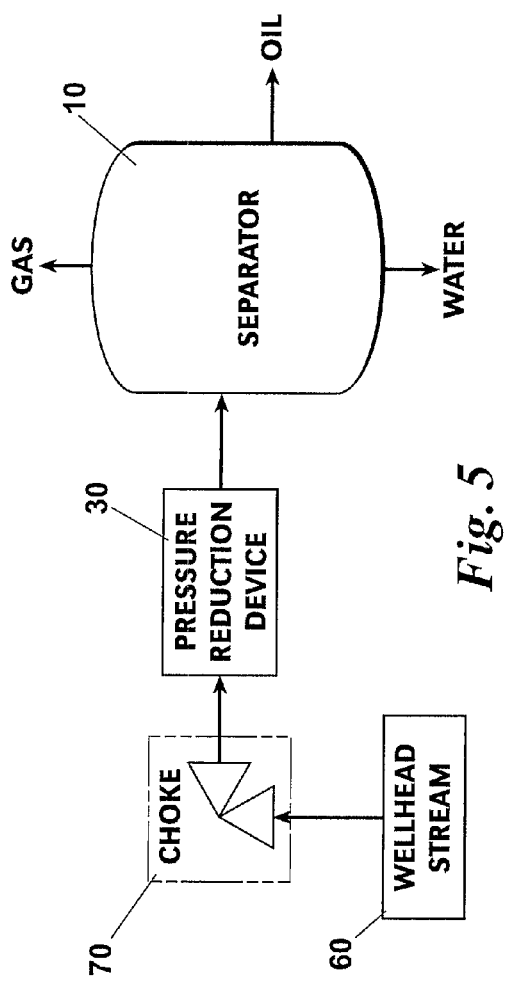
FIG. 5 is a flow diagram showing the system for improving oil-and-water separation, according to an embodiment of the present invention. The system is comprised of a wellhead choke valve and a pressure reduction device.

Referring to FIG. 5, an embodiment for a system for improving oil-and-water separation is comprised of a wellhead choke valve 70 followed by a pressure reduction device 30. The wellhead stream 60 is passed through the system and then to a downstream treatment process, such as a first separator vessel 10. The majority of pressure drop occurs in the pressure reduction device 30, thereby minimizing the shearing of the fluid stream and facilitating subsequent oil-and-water separation.

Figure 6:
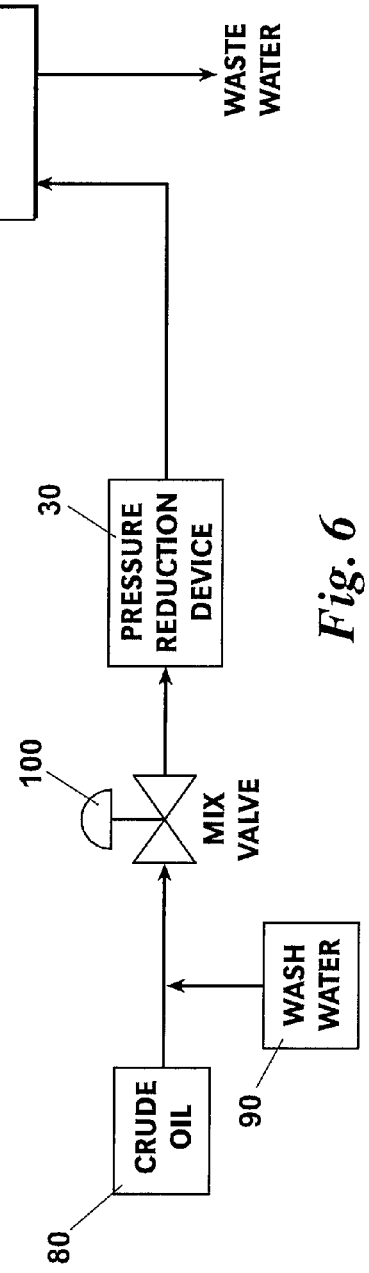
FIG. 6 is a flow diagram showing the system for improving oil-and-water separation, according to an embodiment of the present invention. The system is comprised of a mixing valve and a pressure reduction device. After passing through the system, the fluid stream is treated by a desalter.

Referring to FIG. 6, another embodiment of the system is presented. The system is comprised of a mixing valve 100, which is used to combine crude oil 80 and wash water 90 into a fluid stream, followed by a pressure reduction device 30. The centrifugal force within the pressure reduction device 30 aids in the coalescence of water droplets that were sheared by the mixing valve 100. The fluid stream passes from the system to a desalter 110, where the larger water droplets increase the efficiency of the dehydration process.

The valve and pressure reduction device of the present invention reduce the pressure of the incoming fluid stream to a lower pressure that is suitable for downstream uses or further treatment. Because the pressure reduction device has low shear, droplets of oil and water are not broken into smaller droplets as the pressure drops. (Droplet size is typically related to the shear rate as explained by J. O. Hinze, "Fundamentals of the hydrodynamic mechanism of splitting in dispersion processes," AIChE Journal, Vol. 1, No. 3, pages 289-295, incorporated herein by reference.) In addition, any droplets that may have been sheared into smaller droplets by the valve have a second opportunity to coalesce in the cyclonic-type pressure reduction device. Better oil and water separation may reduce the need for production chemicals such as emulsion breakers or, alternatively, allow the same quantity of chemicals to have greater effect. In addition, both the quality of the oil for use and the quality of the water for subsequent use or disposal are improved. Finally, the invention can be adapted for fluid streams with high flow rates by using multiple wafers or hydrocyclones, either in series or parallel, within a single housing.

While the invention has been described with a certain degree of particularity, many changes may be made in the details of construction, the arrangement of components, the steps of the method, and the order of the steps without departing from the spirit and scope of this disclosure. It is understood that the invention is not limited to the embodiments set forth herein for purposes of exemplification, but is limited only by the scope of the attached claims, including the full range of equivalency to which each element thereof is entitled.

What is claimed is:

1. An improvement for a system including a source of an oil-in-water or water-in-oil stream and an immediate next downstream process in communication with the source, and a valve located between the source and the immediate next downstream process, the improvement comprising:
   a pressure reduction device with a single outlet located between the source and the immediate next downstream process, the pressure reduction device causing a cyclonic flow of the stream, the shearing of oil droplets and water droplets in the stream through the pressure reduction device being less than through the valve alone, wherein pressure of the stream decreases as it flows from the source to the immediate next downstream process.

2. An improvement according to claim 1, wherein the source is a wellhead and the immediate next downstream process is a separator vessel.

3. An improvement according to claim 1, wherein the source is a first separator vessel and the immediate next downstream process is a second separator vessel.

4. An improvement according to claim 3, wherein the first separator vessel is a higher-pressure separator vessel and the second separator vessel is a lower-pressure separator vessel.

5. An improvement according to claim 1, wherein the immediate next downstream process is a desalter.

6. An improvement according to claim 1, wherein the pressure reduction device is a wafer-based hydrocyclone.

7. An improvement according to claim 6, wherein a number of wafers in the wafer-based hydrocyclone varies with a flow rate of the fluid stream.

8. An improvement according to claim 1, wherein the pressure reduction device is a hydrocyclone having an underflow but no overflow.

9. An improvement according to claim 1, further comprising a second pressure reduction device located between the source and the immediate next downstream process, the second pressure reduction device causing a cyclonic flow of the stream.

10. An improvement according to claim 1, wherein the valve is chosen from the group consisting of a flow control valve, a wellhead choke valve, and a mixing valve.

11. An improvement according to claim 1, wherein the valve is regulated by a level controller.

12. An improvement according to claim 1, wherein pressure drop for the valve is less than 20 pounds per square inch.

13. An improvement according to claim 12, wherein pressure drop for the valve is less than 10 pounds per square inch.

14. An improvement according to claim 1, wherein the pressure reduction device is located upstream or downstream of the valve.

15. A method for improving oil-and-water separation in a fluid stream, the method comprising the steps of:
   passing the fluid stream from a source of an oil-in-water or water-in-oil stream to a pressure reduction device with a single outlet; and
   causing cyclonic flow of the fluid stream as it passes through the pressure reduction device,
   wherein pressure of the fluid stream decreases as it flows from the source through the single outlet to an immediate next downstream process and the shearing of oil droplets and water droplets through the pressure reduction device is less than through a valve alone.

16. A method according to claim 15, wherein the pressure reduction device is chosen from the group consisting of a Deltaclone™ and a hydrocyclone having an underflow but no overflow.

17. A method according to claim 15, further comprising the step of causing cyclonic flow of the fluid stream as it passed through a second pressure reduction device.

18. A method according to claim 15, wherein the source is a wellhead or a separator vessel.

19. A method according to claim 15, wherein the immediate next downstream process is a separator vessel.

20. A method according to claim 15, further comprising the step of reducing the pressure of the fluid stream by passing it through a valve that is located upstream or downstream of the pressure reduction device and upstream of an immediate next process.

21. A method according to claim 20, wherein the valve is chosen from the group consisting of a flow control valve, a wellhead choke valve, and a mixing valve.

22. A method according to claim 20, further comprising the step of using a level controller to regulate opening and closing of the valve.

* * * * *